United States Patent
McFall et al.

(10) Patent No.: US 6,615,245 B1
(45) Date of Patent: Sep. 2, 2003

(54) SYSTEM AND METHOD FOR ENABLING A HIERARCHAL COLLABORATION OF DEVICES ACROSS A COMMUNICATION CHANNEL

(76) Inventors: Michael E. McFall, 23973 Arroyo Park Dr., #116, Santa Clarita, CA (US) 91355; Carl Sturmer, 1116 W. Long St., Stephenville, TX (US) 76401; Kelly Graves, 2-14 Street NW, #401, Calgary, Alberta (CA), T2N 1Z4

( * ) Notice: Subject to any disclaimer, the term of this patent is extended or adjusted under 35 U.S.C. 154(b) by 0 days.

(21) Appl. No.: 09/287,198

(22) Filed: Apr. 6, 1999

Related U.S. Application Data
(60) Provisional application No. 60/099,463, filed on Sep. 8, 1998.

(51) Int. Cl.[7] .............................................. G06F 15/16
(52) U.S. Cl. ...................... 709/213; 709/104; 709/212; 709/217; 709/218; 709/219; 709/246; 709/229
(58) Field of Search ................................. 709/201, 202, 709/203, 204, 104, 200, 212, 213, 217, 218, 219; 707/9, 10; 705/39, 40

(56) References Cited

U.S. PATENT DOCUMENTS

| | | | | |
|---|---|---|---|---|
| 5,371,852 A | * | 12/1994 | Attanasio et al. | 370/401 |
| 5,687,372 A | * | 11/1997 | Hotea et al. | 707/200 |
| 5,708,780 A | * | 1/1998 | Levergood et al. | 709/218 |
| 5,734,828 A | * | 3/1998 | Pendse et al. | 709/203 |
| 5,774,660 A | * | 6/1998 | Brendel et al. | 709/100 |
| 5,774,668 A | * | 6/1998 | Choquier et al. | 370/480 |
| 5,944,780 A | * | 8/1999 | Chase et al. | 709/201 |
| 6,014,647 A | * | 1/2000 | Nizzari et al. | 705/39 |
| 6,105,027 A | * | 8/2000 | Schneider et al. | 707/10 |

* cited by examiner

*Primary Examiner*—Majid Banankhah

(57) ABSTRACT

A system and method for enabling a hierarchal collaboration of devices across a common communication channel, e.g., the Internet. Embodiments of the present invention define a plurality of devices, e.g., computer systems operating as servers. Each device is capable of receiving one or more inquiries from at least one user and locally providing data in response to such inquiries. However, when the locally available data is not responsive to the user's inquiry, the inquiry is redirected to another device that has responsive data and the response is received therefrom. In accordance with a significant feature of a preferred embodiment, a common resource exchange stores status data corresponding to each device. This status data, e.g., data corresponding to the ability and availability of each device to provide a response, is used to determine where (to which device) the inquiry is redirected.

32 Claims, 5 Drawing Sheets

RESOURCE TABLE

| ORG ID - 40a | CAPACITY - 40b | CURRENT LOAD - 40c | IP ADDRESS - 40d | RESOURCE CLASS - 40e | RESOURCE ID - 40f | PERMISSIONS - 40g | VISIBILITY - 40h |
|---|---|---|---|---|---|---|---|
| | | | | | | | |
| | | | | | | | |
| | | | | | | | |
| | | | | | | | |
| | | | | | | | |
| | | | | | | | |
| | | | | | | | |

FIG. 2

MESSAGE CENTER

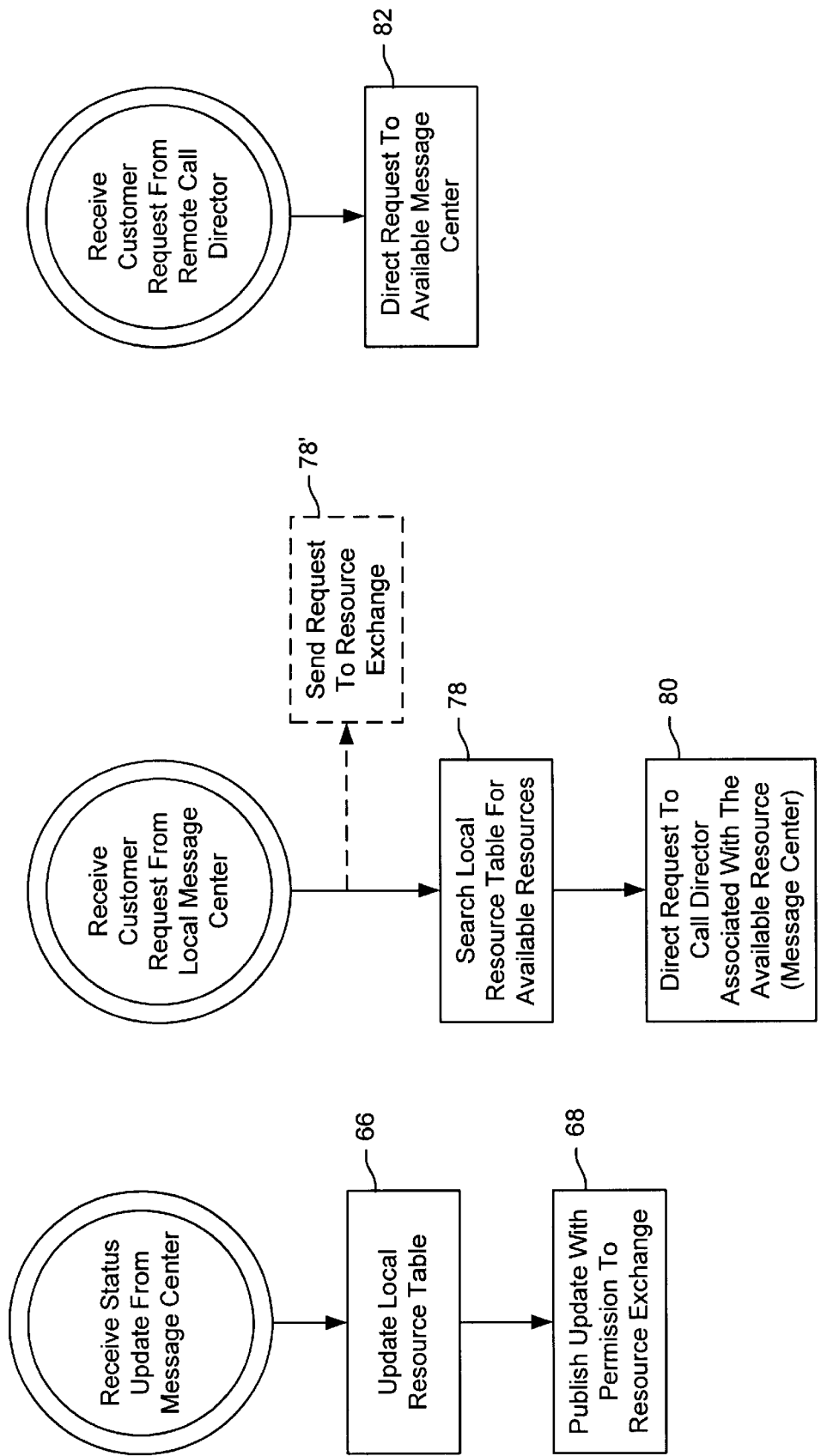
FIG. 3B CALL DIRECTOR

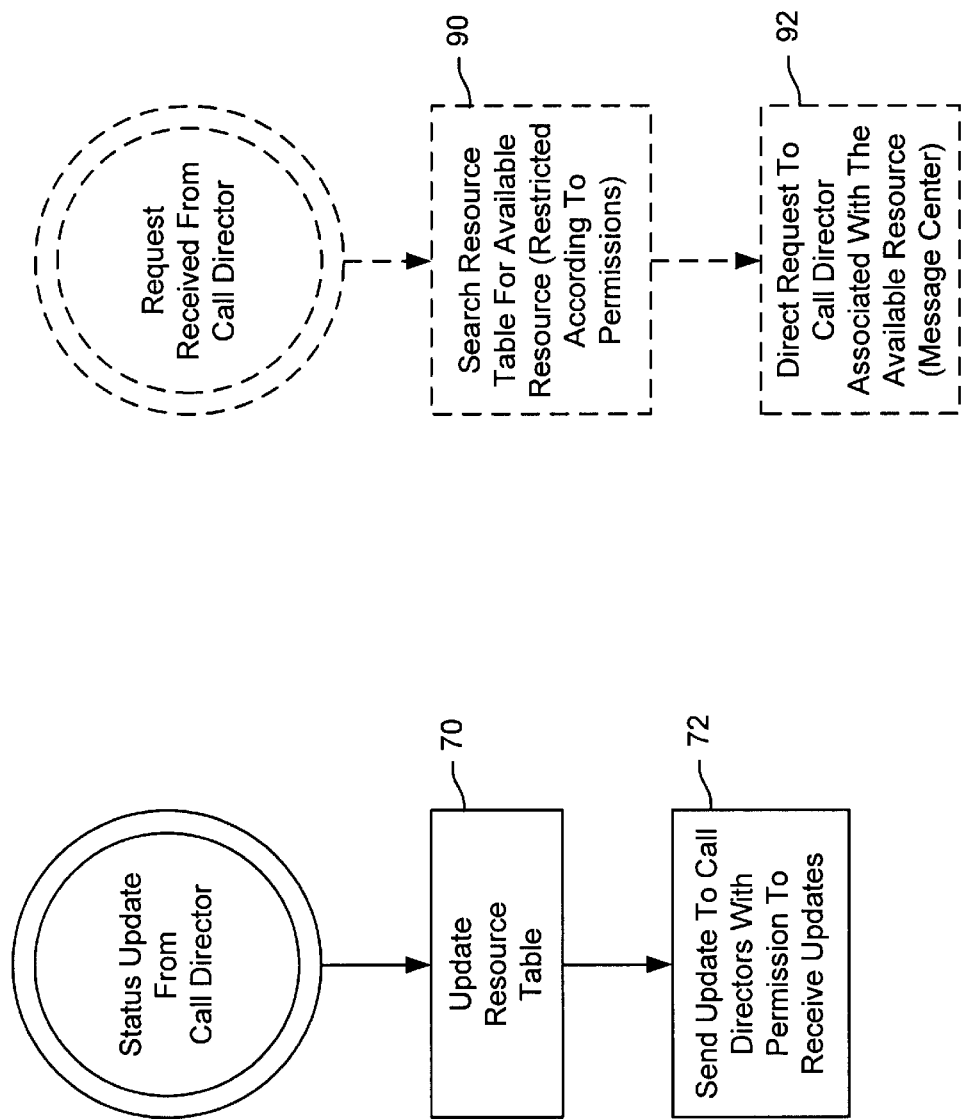

SYSTEM AND METHOD FOR ENABLING A HIERARCHAL COLLABORATION OF DEVICES ACROSS A COMMUNICATION CHANNEL

This application claims the benefit of U.S. Provisional Application No. 60/099,463 filed Sep. 8, 1998.

BACKGROUND OF THE INVENTION

The present invention relates generally to a system and method for enabling a hierarchal collaboration of devices, e.g., computer systems, across a communication channel.

DESCRIPTION OF THE PRIOR ART

Many organizations have adopted the Internet and Internet technologies as channels for both primary internal and external communications and the distribution of products. These new channels are driving the development of systems to handle the rapid flow of data, information and products between global partners. New products are introduced at an ever-increasing rate and new multi-vendor partnerships are being created for their packaging, delivery and support.

As complex new products are developed and distributed using Internet-based supply chains, customers expect that the right answer is "just one click away" and hit their web browsers first, looking for the quick fix of a friendly self-help system. Typically, their experience is quite different as out of date FAQs and long delay E-mail systems force them to use their telephones. Due to the complexity of the product, the first vendor they call probably does not have an answer to their problem, and this requires them to make additional calls to further search for a vendor who has a resolution.

U.S. Patents directed to related apparatus include:

U.S. Pat. No. 5,371,852 describes to method and apparatus for enabling a cluster of computers to appear as a single computer to host computers outside the cluster;

U.S. Pat. No. 5,687,372 describes a link manager process that selects application processes to execute applications based on computational load distribution criteria, so as to distribute computation load as evenly as possible over the server computers to maximize the throughput and responsiveness of the system;

U.S. Pat. No. 5,708,780 describes the use of a secondary server which determines whether a client has an authorization or a valid account and subsequently provides the user a session identification which allows the user access to the requested file;

U.S. Pat. No. 5,734,828 describes an on-line/information service system constituted with a caller management server and a number of on-line/information servers;

U.S. Pat. No. 5,774,660 describes the use of a load balancer which receives all requests from clients and subsequently passes the requests to a second node having the requested resource; and U.S. Pat. No. 5,774,668 describes the use of Gateway microcomputers which receive a request over a WAN and, after applying a load balancing method accordingly to a periodically-updated service map, redirect the request over a LAN to an application server.

SUMMARY OF THE INVENTION

The present invention relates to a system and method for enabling a hierarchal collaboration of devices across a common communication channel, e.g., the Internet. Embodiments of the present invention define a plurality of devices, e.g., computer systems operating as servers. Each device is capable of receiving one or more inquiries from at least one user and locally providing data in response to such inquiries. However, when the locally available data is not responsive to the user's inquiry, the inquiry is redirected to another device that has such data, and the response is received therefrom.

In accordance with a significant feature of a preferred embodiment, a common resource exchange stores status data corresponding to each device. This status data, e.g., data corresponding to the ability and availability of each device to provide a response, is used to determine where (to which device) the inquiry is redirected.

In a preferred embodiment, a system for enabling a plurality of devices to collaborate across a communication channel comprises (1) a common resource exchange for storing status data corresponding to each device and providing the status data to each device, and (2) two or more devices each comprising (A) at least one uniquely-identified message center processor capable of receiving a data request from at least one user and providing a response to the data request to the user; and (B) a director processor associated with the message center processor capable of redirecting the data request from the message center processor to another message center processor according to the status data provided from the resource exchange. Additionally, the message center processors are coupled to each other using a common communication channel.

In a further aspect of a preferred embodiment, each of the director processors is capable of receiving the redirected data requests from another director processor and directing the data requests to an associated message center processor.

In still a further aspect of a preferred embodiment, the Internet is used as the common communication channel.

The novel features of the invention are set forth with particularity in the appended claims. The invention will be best understood from the following description when read in conjunction with the accompanying drawings.

BRIEF DESCRIPTION OF THE DRAWINGS

FIG. 2 is an exemplary block diagram of the resource table maintained in the commonly accessible resource exchange of FIG. 1; and FIGS. 3A–3C show exemplary flow charts of the respective operations of the message centers, call directors and the resource exchange of FIG. 1.

DESCRIPTION OF THE PREFERRED EMBODIMENTS

The present invention relates to a system and method for enabling a hierarchal collaboration of devices across a common communication channel, e.g., the Internet. Embodiments of the present invention define a plurality of devices, e.g., computer systems preferably operating as servers, each of which is capable of receiving one or more inquiries from at least one user and locally providing data in response to such inquiries. However, when the locally available data is not responsive to the user inquiry, the inquiry is redirected to another device which has such data and the response is received therefrom.

In accordance with a significant feature of a preferred embodiment, a common resource exchange stores status data corresponding to each device. This status data, e.g., data corresponding to the ability and availability of each device to provide a response, is used to determine where (to which server) the inquiry is redirected.

The present invention is a of particular use when used as part of an On Line Customer Support (OLCS) system. Typically, it has been observed that support for new products, e.g., software or other PC products, has been limited. Preferably, a user desires and expects to be able to obtain on-line, e.g., Internet support, by addressing his problem to a single organization's web-site. However, it has been typically found that the user must instead find the desired information among numerous organizations' websites. Furthermore, the user may need to revert to telephone-based support from one or more organizations to resolve the user's product support issue. In contrast, the present invention describes a system of servers interconnected in conjunction with a common database maintained in the resource exchange. The common database facilitates the ability of a user to request support from a single location, e.g., an Internet site, and have any issues not resolved at that site be automatically redirected to one or more other support sites.

Figure 1:
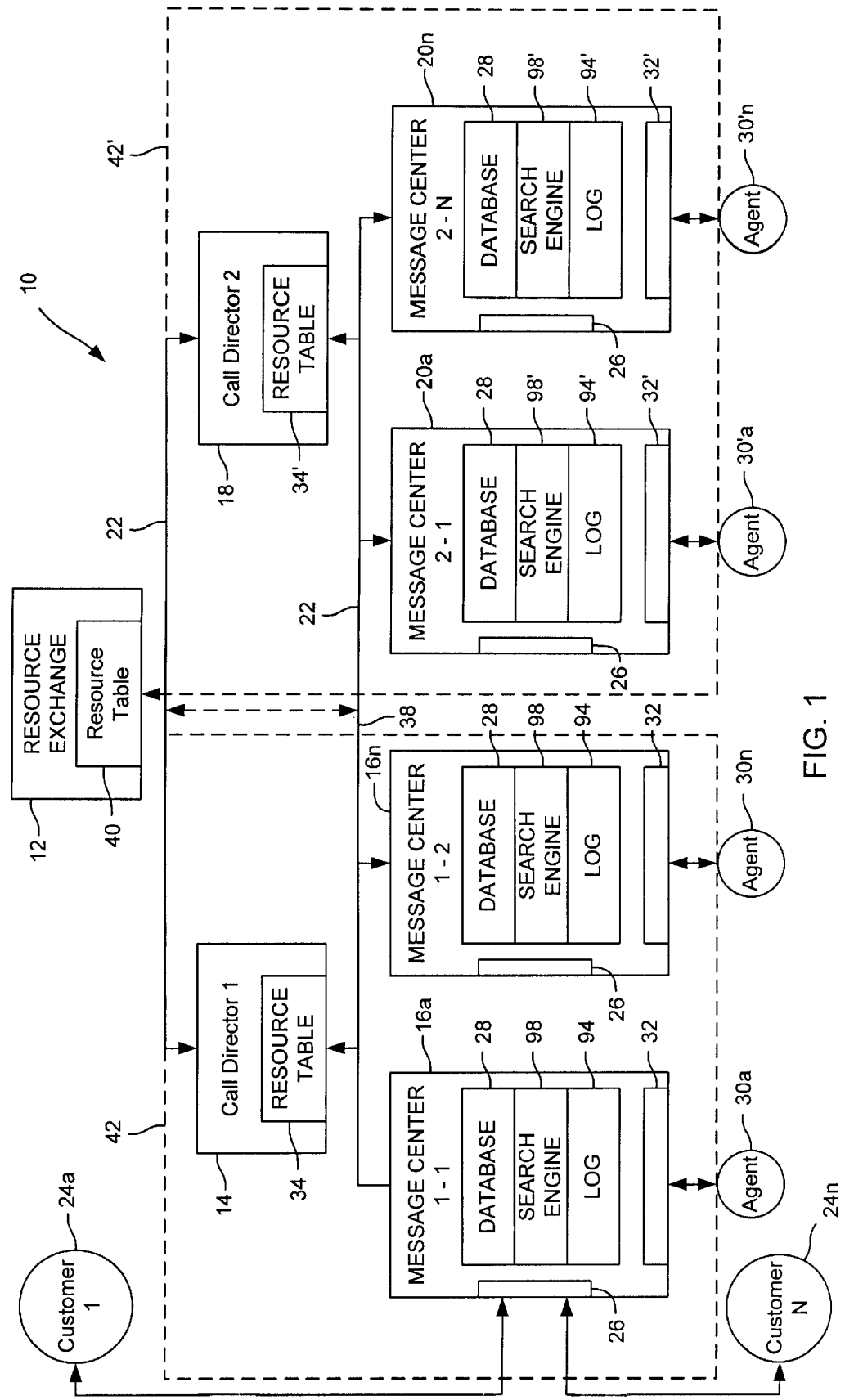
FIG. 1 is a top level functional block diagram of a preferred system for enabling a plurality of servers to collaborate across a communication channel.

FIG. 1 shows a top level functional block diagram of a preferred system 10 for enabling a plurality of servers to collaborate across a communication channel. Collaboration system 10 is primarily comprised of a resource exchange 12, a first call director 14 coupled to one or more message centers 16, and a second call director 18 coupled to one or more message centers 20. In a preferred embodiment, each of the aforementioned elements, i.e., the resource exchange 12, the call directors 14 and 18 and the message centers 16 and 20, are independently operating servers coupled to a common communication channel 22. Preferably, the communication channel 22 is the Internet. Accordingly, while the Internet inherently provides communication paths (shown as solid and dashed lines) between all of the aforementioned elements, embodiments of the present invention preferably only use the paths shown as solid lines.

Each message center 16, 20 is coupled to one or more customers 24, i.e., individuals who are requesting information from the system 10. Alternatively, the customers 24 are other systems, e.g., servers. Preferably, the customers 24 are directly coupled to the message centers 16, 20, e.g., via an RS-232 communication port 26. Alternatively, the customers 24 are coupled to the message centers 16, 20 via the common communication channel 22. The customers 24 request information from a message center 16a, preferably found in a database 28 local to that message center. In a first preferred embodiment, an agent 30 is coupled to the message center 16, e.g., via an RS-232 communication port 32. Agent 30 searches for any relevant responses to the data request in the local database 28, associates the data found to the request, and accordingly responds to the customer 24 via the message center 16. In a first preferred embodiment, agent 30 is an individual, e.g., a customer support representative who operates on the local database 28, preferably with the assistance of a search engine within the message center 16. In an alternative embodiment, the agent 30 is a computer program, that is, a software-implemented process, preferably within the message center 16, that implements the associated search and association tasks.

There are two primary reasons why a message center 16 and its associated agent 30 may not be able to respond to a customer's request. First, the agent 30 may be busy, e.g., already occupied with finding a reply to another customer's request. Second, the local database 28 may not have data responsive to the customer's request. The present invention solves this problem by directing the customer's request to another message center 20 that (1) has an agent 30' that is available and (2) has access to a local database 28' that has data responsive to the customer's request.

To obtain responsive data, the call director's 16 primary function is to redirect a customer's request to a message center 20 that will answer the customer's request. To accomplish this task, each call director 14, 18 maintains a resource table 34 (described further below) that describes the availability and resource class of each message center 16, 20 in system 10. Accordingly, when the first message center 16 sends an unfulfilled request to the first call director 14 via path 36, the first call director 14 selects a remote message center e.g., 20, from resource table 34 that can currently fulfill the request. Preferably, the request is first forwarded to the second call director 18 associated with the selected remote message center 20. The second call director 18 then forwards the request to the selected message center 20. The selected message center 20 then generates a response as previously described. However, instead of directly replying to the customer 24, the agent's reply is preferably now sent from the second message center 20 to the first message center 16 via path 38. The first message center 16 then forwards the reply to the customer 24.

Optionally, the redirecting can be transparent to the customer 24, or the customer may be informed that a different agent 30' and its associated message center 20 have generated the reply. Thus, the visibility of the message center providing a reply to users can be open or restricted. Business reasons may dictate open or restricted visibility. For example, call director$_1$ 14 may be associated with company A and the user 24 may expect that company A has sufficient resources and expertise to handle any question asked. However, company B may be used by company A, to collaborate in responding to customers of company A. Company A may wants its customers to not know of this collaboration. In that case, a visibility attribute (see FIG. 2) within the resource table 40 can be set to restrict the visibility of the message centers 20 associated with company B.

For security reasons, it may be preferable that the access between message centers, e.g., 20a to 16a via path 38, be restricted. Accordingly, in a preferred embodiment, a temporary ID, e.g., a token, is directed to the second call director 18 which is then forwarded to the selected message center 20. When message center 20 connects to message center 16, it uses this temporary ID to enable access to message center 16, but only for the duration of the session. A session may be a single response to the customer's original query or it may be a series of interactive queries. In any case, the temporary ID allows these communications to continue until the end of the session. However, once that session concludes, the temporary ID expires and message center 20 is again restricted from accessing message center 16.

To accomplish the aforedescribed redirecting, each call director 14, 18 must have an updated resource table 34 to determine potential destinations for a customer's request. This task is accomplished in conjunction with the resource exchange 12. As each agent's 30 status changes, e.g., they become busy or free, this information is forwarded via the message center 16, 20 to its associated call director 14, 18. The call director 14, 18 then publishes this information to the resource exchange 12. The resource exchange 12 then updates its resource table 40 accordingly. The resource exchange 12 then sends this updated information to the call directors 14, 18 in system 10 which can then update their local resource tables 34.

Generally, updated status information can be broadcast to all of the call directors 14, 18 in system 10. However, there are cases in which customers of a call director 14, 18 and its associated message centers 16, 20 are not permitted access to certain other call directors 14, 18 and/or their associated message centers 16, 20 while still allowing access to other call directors 14, 18 and/or message centers 16, 20. In an exemplary case, call director$_1$ is associated with company A and call director$_2$ is associated with company B, a competitor of company A. Call director$_3$ is associated with company C which has resources that are to be available to all customers of system 10. In this case, call director$_1$ and call director$_2$ receive updates when changes occur in call director$_3$ but neither call director$_1$ nor call director$_2$ receive updates associated with each other. In such cases, the updates from the resource exchange 12 are directed only to the authorized subscribers. While the local resource table 34 is typically identical to the resource table 40 in the resource exchange 12, this is not always the case. In cases where access is restricted, the local resource table 34 will be a subset of the resource table 40 in the resource exchange 12.

In the previously described embodiment, each call director 14, 18 selects the destination message center 16, 20 according to its local resource table 34, which it has kept in synchronization with resource table 40 in the resource exchange 12. Alternatively, a single resource table 40 can be kept only in the resource exchange 12. In such an alternative embodiment, the call director 14, 18 sends all requests that need to be redirected directly to the resource exchange 12 and the resource exchange 12 does the redirection.

Further, while the aforedescribed topology preferably uses a common communication resource, e.g., the Internet, for all portions of the interconnections of the elements, it is recognized that it may be desirable to use other interconnection methods between some of the elements. For example, it may be desirable to implement a call director 14 and its associated message center(s) 16 as a single server 42 (shown within a dotted line). In such a case, the call director 14 and message center(s) 16 may be software-implemented components that are interconnected via a software implementation on the single server. Alternatively, the call director 14 and message center(s) 16 may be implemented as separate computers that are interconnected via a common backplane or a local area network, etc. Many such implementations should be apparent to one of ordinary skill in the art. All such implementations are considered to be equivalent and thus within the scope of the present invention.

FIG. 2 shows an exemplary block diagram of the resource table 40 maintained in the resource exchange 12 in the corroboration system 10. The resource table 40 contains sufficient data to enable the call directors 14, 18 (using a subset of this data in their resource tables 34) to select an available message center that has data, i.e., within a resource class, that can respond to a user's request. Of course, this determination is only made if the receiving message center lacks capacity or capability to respond to the user's request. The following is an exemplary definition of parameters found in the resource table 34 for each message center.

| | |
|---|---|
| ORG ID 40a | The identity of the support organization. |
| CAPACITY 40b | The number of user requests that the message center can concurrently process. |

-continued

| | |
|---|---|
| CURRENT LOAD 40c | The number of user requests currently being processed. |
| IP ADDRESS 40d | The TCP/IP address for the message center. |
| RESOURCE CLASS ID 40e | Identification, e.g., alphanumeric or boolean or a predefined class identifier, of the type of data found in the local database 28 of this message center. |
| RESOURCE ID 40f | Identification of a subclass, pertaining to this particular message center. |
| PERMISSIONS 40g | Identification of the organizations that are not to receive access or updates as to changes in availability of this message center. |
| VISIBILITY 40h | Whether this message center is to be visible (or hidden) from the user. |

In operation, the sections (columns in this example) of the resource table 40 not restricted from access for a given organization due to the PERMISSIONS field 40 $g$ are sent to each call director 14, 18 after they are updated in the resource exchange 12. Thereafter, the table subset present in resource table 34 of each call director 14, 18 is used in making the redirection selections.

Figure 3A:
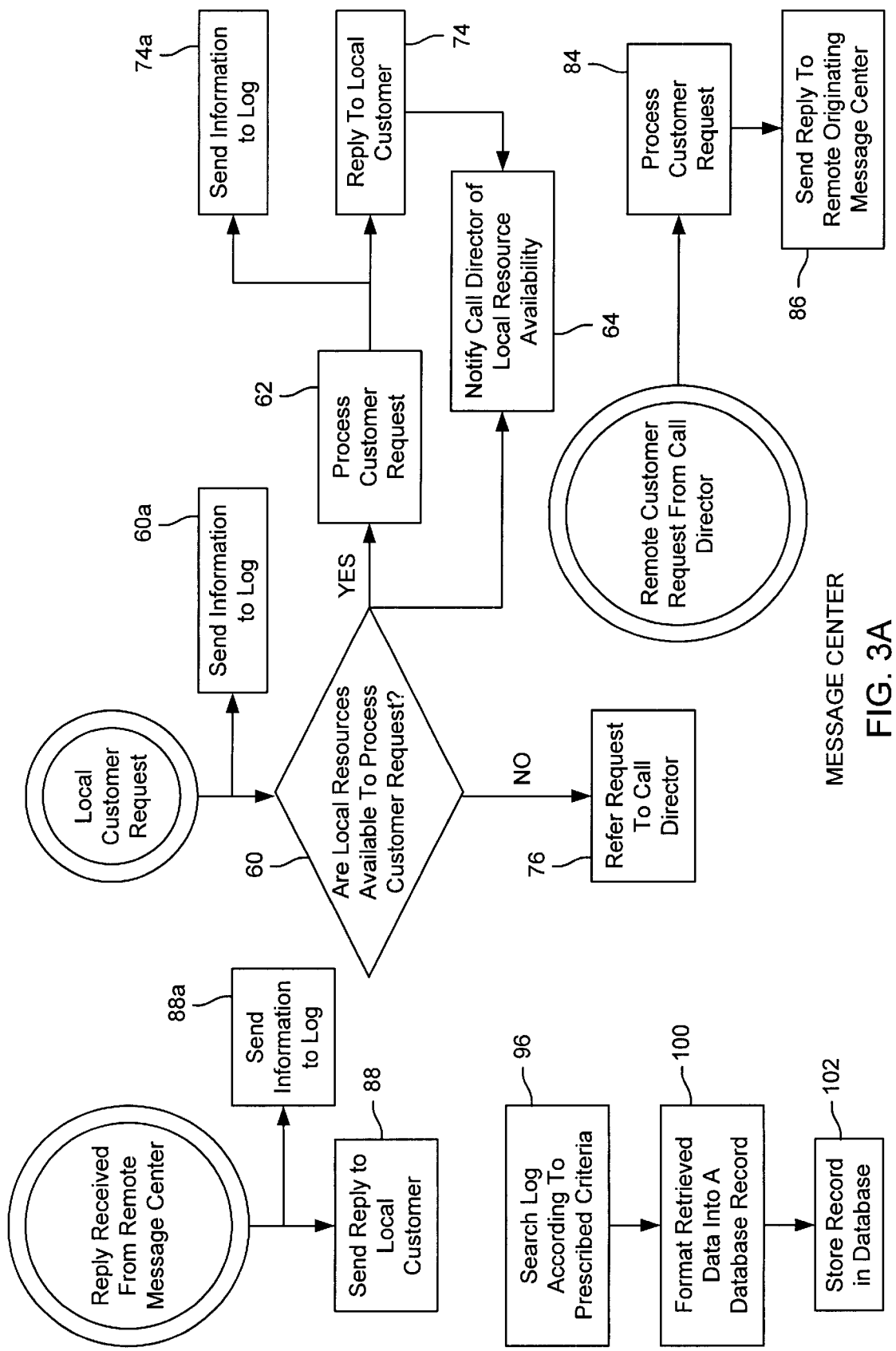

FIGS. 3A–3C show exemplary flow charts of the respective operations of the message centers 16, 20, the call directors 14, 18 and the resource exchange 12 of the collaboration system 10. Each element operates essentially independently on a plurality of concurrent tasks that are best understood by following the flow charts to see how these tasks interact.

Initially, a customer 24 requests a piece of information or a response to an inquiry from a selected message center 16. In block 60, the message center 16 determines if local resources are available to process the customer request, i.e., is the agent 30 available and is data available in the database 28 to address this request? Alternatively, the agent 30 may make the determination as to the suitability of the local database 28 for use with this request. In the simplest case when resources are available, the customer request is addressed by the agent 30 in block 62 of the message center 16. In block 64, the message center 16 notifies the call director 14 that agent 30 is now unavailable. In block 66, the call director 14 updates its local resource table 34 and (shown in block 68) publishes the update (with any associated permissions) to the resource exchange 12. In block 70, the resource exchange 12 receives the published update and updates its resource table 40 and (shown in block 72) the resource exchange 12 sends updates to the call directors that have permission to receive the updates. Meanwhile (shown in block 62 of the message center 16), the customer request continues being processed and (shown in block 74) the message center 16 sends its reply to the customer 24 and frees up agent 30. Afterwards, the message center 16 notifies the call director of the status change in block 64.

Alternatively, if local resources are unavailable, the customer request is referred (shown in block 76) to the call director 14. In block 78, the call director 14 searches its resource table 34 to select a message center e.g., 20, available to handle the request. In block 80, the call director 14 then directs the request to the call director, e.g., 18, which is associated with the selected message center 20. In block 82, the call director 18 then directs the request to the selected message center 20. In block 84, the message center 20 processes the customer request and (shown in block 86) the message center 20 sends a reply to the originating message center, i.e., message center 16. In block 88, the message center 16 sends the reply, received from the message center 20, to the local customer 30.

As previously discussed, the tasks of blocks 78 and 80 can alternatively be shifted to the resource exchange 12. In this alternative implementation, once the customer request is received in block 78', the request is sent on to the resource exchange 12. In block 90, the resource exchange 12 searches its resource table 40 for available resources (restricted according to permissions) and (shown in block 92) directs requests to the call director, e.g., 18, which is associated with a message center, e.g., 20, available to handle the request.

The disclosed structure allows additional functionality to be conveniently added. For example, each message center 16, 20 preferably contains a log storage 94 that maintains a record of textual transactions between the agent 30 and the customer 24. This log storage 94 is preferably updated in blocks 60a and 74a when a customer request is handled locally, i.e., by the original message center. However, when a remote message center handles the customer request, the remote log storage 94' is preferably updated in blocks 86a and 88a. Using a search engine 98, the agent 30 processes the log storage 98 (shown in block 96) according to user prescribed criteria to select textual transactions the are related to classes of problems and solutions. The agent 30 can then (shown in block 100) remove any superfluous text and format the textual data. The format is compatible with the database 28, e.g., as an HTML file, and (shown in block 102) the formatted data is stored in the database 28. The newly stored problem and solution is now available to improve the message center's ability to respond to the next customer request. Alternatively, the message center 16, 20 can contain software, e.g., a scheduler that works in conjunction with the search engine 98, to periodically extract information from the log storage 94 according to prescribed criteria and update the database 28 accordingly.

Although the present invention has been described in detail with reference only to the presently-preferred embodiments, those of ordinary skill in the art will appreciate that various modifications can be made without departing from the invention. For example, while it has been described that the present invention is of particular use as part of an On Line Customer Support (OLCS) system, the present invention would also be useful in other database retrieval applications as would be apparent to one of ordinary skill in the art. Accordingly, the invention is defined by the following claims.

We claim:

1. A system for enabling a plurality of devices to collaborate across a communication channel, said system comprising:

a common resource exchange for storing status data corresponding to each said device and providing said status data to each said device;

a first device comprising:
at least one uniquely-identified first message center processor capable of receiving a data request from at least one user and providing a response to said data request to said user; and
a first director processor associated with said first message center processor capable of redirecting said data request from said first message center processor to another message center processor according to said status data provided from said resource exchange;

a second device comprising:
at least one uniquely-identified second message center processor capable of receiving a data request from at least one user and providing a response to said data request to said user; and
a second director processor associated with said second message center processor capable of redirecting said data request from said second message center processor to another message center processor according to said status data provided from said resource exchange; and wherein
said message center processors are coupled to each other using a common communication channel.

2. The system of claim 1 wherein each of said director processors is capable of receiving said redirected data requests from another director processor and directing said data requests to an associated message center processor.

3. The system of claim 1 wherein said resource exchange is coupled to said director processors using said common communication channel.

4. The system of claim 1 wherein said common communication channel is the Internet.

5. The system of claim 1 wherein each said message center processor additionally comprises a database for containing data responsive to data requests from said users.

6. The system of claim 5 wherein each said message center processor is capable of interfacing to an agent for controlling access to said database in response to said user data request.

7. The system of claim 6 wherein said agent is a person.

8. The system of claim 6 wherein said agent is a software-implemented process.

9. The system of claim 6 wherein said agent is interfaced to said message center processor using said common communication channel.

10. The system of claim 5 additionally comprising a log for recording transactions between one said user and one said message center.

11. The system of claim 10 wherein said message center additionally enables data to be extracted from said log file and added to said database.

12. The system of claim 1 wherein said first director processor and said first message center processors are formed as a single server.

13. The system of claim 1 wherein said status data includes data for restricting a user from viewing the identity of said message center processor which is providing responses to said user.

14. A method for providing data to one or more users from one of a plurality of devices coupled to each other across a common communication channel, wherein each of said devices maintains status data in a common resource exchange, said method comprising the steps of:

said user requesting data from a first one of said devices;

said first device determining whether said data is locally available from said first device and delivering said data to said user if said data is locally available;

said first device retrieving status data from said resource exchange;

said first device directing said data request to a second device according to said retrieved status data;

said second device generating a reply to said requested data;

said second device directing said reply to said first device; and said first device providing said reply to said user.

15. The method of claim 14 additionally comprising the steps of:
    said devices notifying said resource exchange of status changes in each said device; and
    said resource exchange notifying each said device whenever said resource exchange has been notified of a status change in one of said devices.

16. The method of claim 14 additionally comprising the step of each said device logging transactions between said devices and said users.

17. The method of claim 16 additionally comprising the step of periodically searching for logged transactions according to prescribed criteria.

18. The method of claim 17 additionally comprising the steps of:
    formatting a database entry according to logged transactions found in said searching step; and
    storing said formatted entry in a database.

19. The method of claim 14 wherein said providing step additionally comprises identifying said second device to said user conditional upon visibility data within said status data.

20. A method for providing data to a user from one of a plurality of devices coupled to each other across a common communication channel, wherein a common resource exchange maintains status data corresponding to each said device, said method comprising the steps of:
    said user requesting data from a first one of said devices;
    said first device determining whether said data is locally available from said first device and delivering said data to said user if said data is locally available;
    said first device directing said data request to said resource exchange and said resource exchange directing said data request to a second device according to said status data contained within said resource exchange;
    said second device generating a reply to said requested data;
    said second device directing said reply to said first device; and
    said first device providing said reply to said user.

21. The method of claim 20 additionally comprising the step of said devices notifying said resource exchange of status changes in each said device.

22. The method of claim 20 additionally comprising the step of each said device logging transactions between said devices and said users.

23. The method of claim 22 additionally comprising the step of periodically searching for logged transactions according to prescribed criteria.

24. The method of claim 23 additionally comprising the steps of:
    formatting a database entry according to logged transactions found in said searching step; and
    storing said formatted entry in a database.

25. The method of claim 20 wherein said providing step additionally comprises identifying said second device to said user conditional upon visibility data within said status data.

26. In an on-line customer support environment, a collaboration system for connecting some or all of a plurality of customer systems, comprising:
    a plurality of message center processors, wherein each message center processor includes customer support data, customer support logs and has associated therewith an availability status;
    a plurality of call directors, wherein each call director is associated with an entity;
    a plurality of resource tables, wherein each resource table is associated with one of the call directors and maintains at least availability statuses for each message center processor associated with the entity associated with the resource table's call director;
    intake logic within each message center processor for accepting messages from customers;
    transfer logic within each message center processor for transferring a customer from that message center processor to another message center processor when that message center processor determines that it does not have customer support data to support that customer, including logic to consider the availability status of the other message center processor when determining which message center processor to transfer the customer to; and
    a resource exchange coupled to the plurality of call directors for providing updates as to availability status of at least some of the plurality of message center processors.

27. The collaboration system of claim 26, wherein the resource exchange includes logic to selectively provide updates such that a call director is not updated as to availability of a set of message center processors where the set of message center processors is associated with an entity that has not authorized that call director to handle its calls.

28. The collaboration system of claim 26, wherein the message center to customer communication and the call director to resource exchange communication is over a common communication channel.

29. The collaboration system of claim 28, wherein the common communication channel is the Internet.

30. The collaboration system of claim 26, wherein the intake logic couples a customer computer system to one of the message center processors, the message center processors are operated by agents and the availability status for a message center processor is an indication as to whether the agent operating that message center processor is available handle addition customer interactions.

31. The collaboration system of claim 30, wherein the agents are persons.

32. The collaboration system of claim 30, wherein the agents are software-implemented processes.

* * * * *